United States Patent [19]
Martinez et al.

[11] Patent Number: 6,147,683
[45] Date of Patent: Nov. 14, 2000

[54] GRAPHICAL SELECTION MARKER AND METHOD FOR LISTS THAT ARE LARGER THAN A DISPLAY WINDOW

[75] Inventors: Anthony Edward Martinez, Austin, Tex.; Michael David Rahn, Rochester, Minn.

[73] Assignee: International Business Machines Corporation, Armonk, N.Y.

[21] Appl. No.: 09/259,360

[22] Filed: Feb. 26, 1999

[51] Int. Cl.[7] .................................................. G06F 3/14
[52] U.S. Cl. ............................................ 345/341; 345/973
[58] Field of Search .................................. 345/341, 339, 345/340, 347, 348, 973, 974, 123, 124, 125, 336, 338

[56] References Cited

U.S. PATENT DOCUMENTS

| | | | |
|---|---|---|---|
| 5,339,391 | 8/1994 | Wroblewski et al. | 345/341 |
| 5,528,259 | 6/1996 | Bates et al. | 345/121 |
| 5,535,403 | 7/1996 | Li et al. | 345/348 |
| 5,550,559 | 8/1996 | Isensee et al. | 345/124 |
| 5,550,969 | 8/1996 | Torres et al. | 345/348 |
| 5,581,275 | 12/1996 | Glei et al. | 345/123 |
| 5,623,588 | 4/1997 | Gould | 345/326 |
| 5,680,561 | 10/1997 | Amro et al. | 345/341 |
| 5,748,927 | 5/1998 | Stein et al. | 345/333 |
| 5,838,320 | 11/1998 | Matthews, III et al. | 345/341 |
| 5,950,216 | 9/1999 | Amro et al. | 707/515 |
| 6,014,140 | 1/2000 | Strand | 345/341 |

*Primary Examiner*—Crescelle N. dela Torre
*Attorney, Agent, or Firm*—Martin & Associates, L.L.C.; Derek P. Martin

[57] ABSTRACT

A graphical selection marker provides a visual indication of selected items in a list and their relative position in the display window. The graphical selection marker is suitably provided on a scroll bar in each location on the scroll bar that represents a selected item in the list. In this manner, the graphical selection marker indicates a selected item in the list, even if the selected item is not currently visible in the display window.

25 Claims, 7 Drawing Sheets

GRAPHICAL SELECTION MARKER AND METHOD FOR LISTS THAT ARE LARGER THAN A DISPLAY WINDOW

BACKGROUND OF THE INVENTION

1. Technical Field

This invention generally relates to computer programs and more specifically relates to a mechanism and method for a computer program to display information.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful that just a few years ago.

Early computer systems required an extensive knowledge of commands for a user to perform any type of function. These computers employed what is known as a command line in which a specific command would have to be entered to perform most types of operations. This limited the use of computers to those who had the time to learn a large number of relatively cryptic commands.

Later computer systems used a more advanced user interface to make it easier for a computer user to perform functions without knowledge of specific commands. The most common type of modem interface is the graphical user interface, or GUI. A GUI uses some type of symbol, menu or other mechanism which is activated by a computer user with a pointing device (e.g., a mouse, a trackball) to perform many commonly performed tasks. These graphical mechanisms are usually designed to be somewhat consistent and self-explanatory to make it as easy as possible for a user to perform common functions.

Most graphical user interfaces display items in a portion of the screen called a window. In many computer programs, a list is often displayed in a window. When a list is larger than the display window, only part of the list is visible in the window at a time. To view other portions of the list, a graphical device known as a scroll bar is used. Scroll bars allow a user to move up or down a list using a pointing device, such as a mouse, and typically include an up arrow, a down arrow, and a slider. A scroll bar allows a user to move to other parts of a list by clicking on the up or down arrow, by clicking and dragging the slider in the scroll bar, or by clicking above or below the slider on the scroll bar.

A typical graphical user interface includes a mechanism for selecting items on the list. One common way for selecting items on the list is to click on an item with a mouse or other pointing device. Once an item is selected, it is typically displayed in reverse video or in a different color to indicate that it has been selected. However, users often need to select multiple items in a list for some operation. For example, if a user needs to copy several files from a list to a floppy disk, the user needs to select each of the items and perform a copy on all of the selected items at once. One problem with known graphical user interfaces is that there is no visual indication of any selected list items that are outside the range of the current display window. In other words, once an item is selected, and the display window is moved to a different part of the list, there is no indication whether the item that is no longer in the windows is still selected or not.

Typically, a graphical user interface requires a user select items to add to their list of selections in a different way than selecting a single item. For example, a single item may be selected by clicking on the item with a mouse. Clicking on a second item will deselect the first item, and select the second item. If the second item is to be selected in addition to the first item, a different selection mechanism is used. One known example requires the user to hold down the control key "Ctrl" while clicking on the second item in order for both the first and second items to be selected. If a user is navigating through a large list, selecting several items, one inadvertent click without holding the control key will result in all previously-selected items being deselected. Because there is no visual indication of whether items that are outside the display window are still selected or not, the user may not perform the desired operation on all the list items he or she intended to select. Without a mechanism for providing a visual indication to a user of selected items outside of the display window, users will be hampered by not knowing for sure which previously-selected items are still selected when an operation on the selected items is performed.

DISCLOSURE OF INVENTION

According to the present invention, a graphical selection marker provides a visual indication of selected items in a list and their relative position in the display window. The graphical selection marker is suitably provided on a scroll bar in each location on the scroll bar that represents a selected item in the list. In this manner, the graphical selection marker indicates a selected item in the list, even if the selected item is not currently visible in the display window.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to the present invention, a graphical selection marker and method provide a user a visual indication of items in a list that are selected even when the selected items are not visible in the display window. In the preferred embodiments, one or more markers are placed on the scroll bar of a display window to indicate the selected items in the list.

Figure 1:
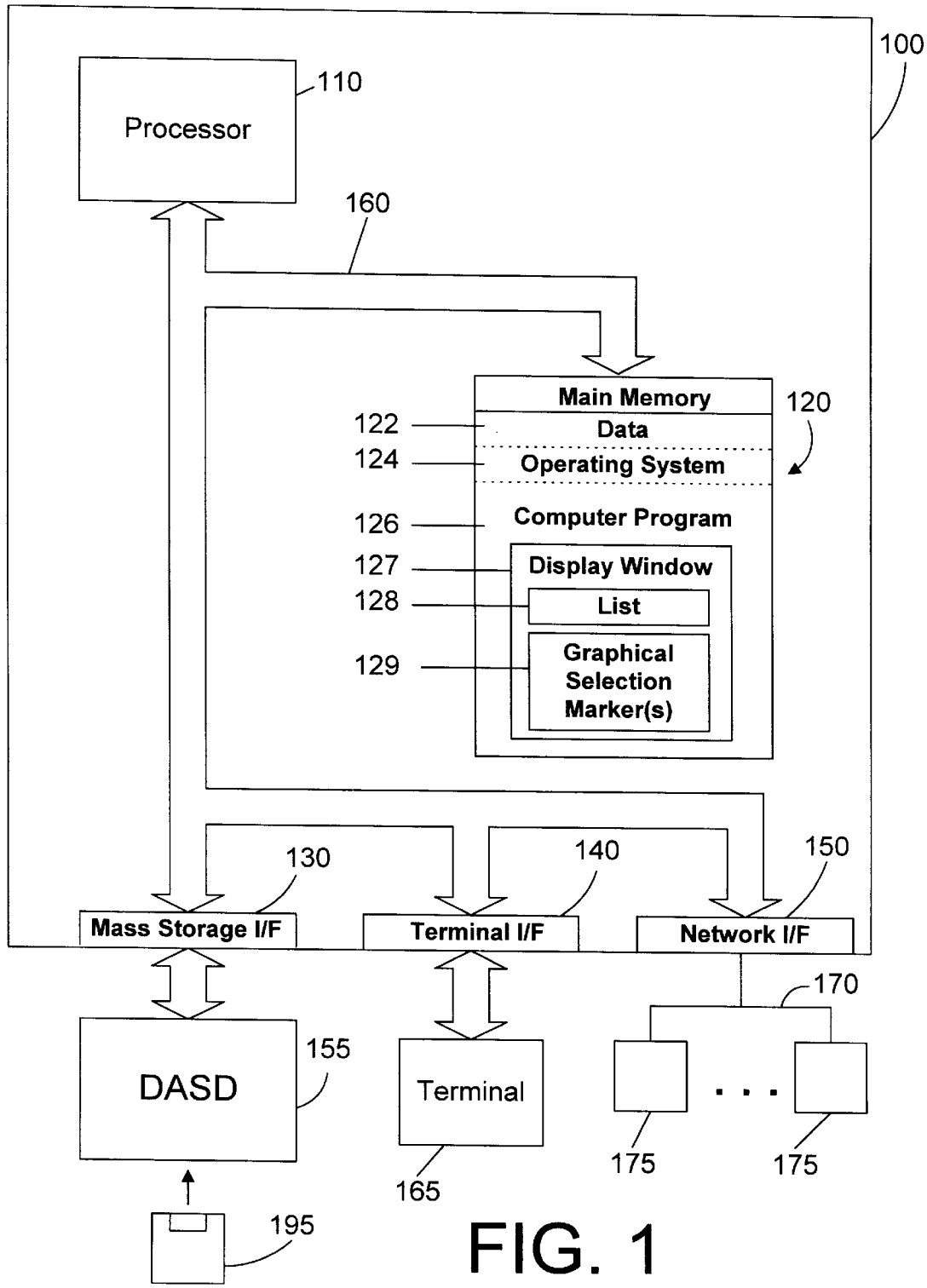
FIG. 1 is a block diagram of an apparatus in accordance with a preferred embodiment of the present invention.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, and a computer program 126 in accordance with the preferred embodiments. Computer program 126 includes a graphical user interface that includes one or more display windows 127. In one display window 127 is displayed a list 128 that is larger than the display window 127. One or more graphical selection markers 129 provide visual indication to the user of selected items in the list, even when the items are not visible in the display window.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Computer program 126 may be any suitable computer program, including system level computer programs such as operating systems, utilities, and system tools; software applications; or any other type of computer program, whether currently known or developed in the future. Computer program 126 includes means for displaying a portion of the list 128 in display window 127 and means for displaying the graphical selection markers 129 to provide a visual indication of one or more selected items in the list that are outside of the display window.

Display window 127 is any suitable display window provided by a graphical user interface to computer program 126. Display window 127 is a means for displaying a portion of a list 128. In the preferred embodiments, the list 128 is bigger than the display window 127, and a graphical mechanism (such as a scroll bar) is provided in the graphical user interface for manipulating the list 128 within the display window 127. Note that the term "list" is used herein to represent a collection of items, and that no specific limiting structure is intended. A list may include a one-dimensional list, such as a list of files, that may be navigated in a single direction. A list may also include two dimensional lists, such as lists of icons or folders, that may be navigated in two directions. A list may also include three dimensional or other types of lists, such as tree structures, that may be navigated in several directions. The term list as used herein expressly includes any and all presentations of multiple items to a user.

Graphical selection marker 129 represents a visual indication to the user of a selected item in the list 128. In the preferred embodiments disclosed herein, the graphical selection marker 129 is represented by a dotted line on a scroll bar that corresponds to the location of a selected item. However, graphical selection marker 129 expressly extends to any graphical indication to a user of selected items in a list. Graphical selection marker 129 may include an arrow, bullet, or any other suitable graphical indication. In addition, while the graphical selection marker 129 is disclosed on a scroll bar in the preferred embodiments, it is equally within the scope of the invention to provide one or more graphical selection markers in a separate display portion that represents the list.

Computer system 100 utilizes well known virtual addressing mechanisms that allow the programs of computer system 100 (such as computer program 126) to behave as if they only have access to a large, single storage entity instead of access to multiple, smaller storage entities such as main memory 120 and DASD device 155. Therefore, while data 122, operating system 124, and computer program 126 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
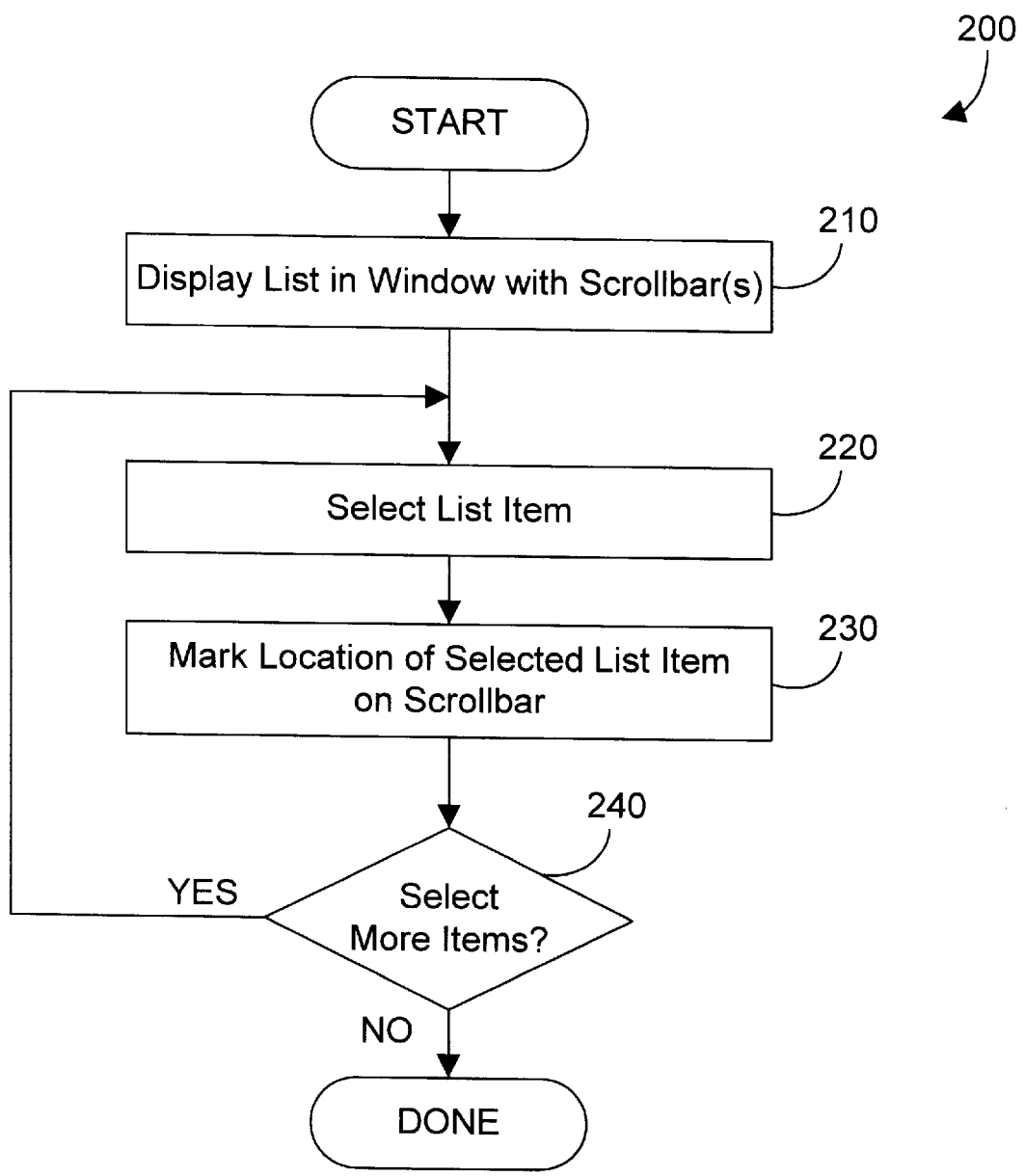
FIG. 2 is a flow diagram showing method steps in accordance with a preferred embodiment of the present invention.

Referring to FIG. 2, a method 200 in accordance with the preferred embodiments begins by displaying a list in a display window, where the list is larger than the display window (step 210). We assume for the purpose of illustration that the graphical user interface uses one or more scroll bars that are commonly known in the art to indicate to the user the portion of the list being displayed, and to provide the user with control surfaces for manipulating the list. A user then selects an item in the list (step 220). The location of the selected item is indicated on the scroll bar (step 230) by displaying a graphical selection marker 129 on the scroll bar. If the user wants to select more items (step 240=YES), steps 220 and 230 are repeated until the user is finished selecting items (step 240=NO). At this point the user may perform operations on the selected items. Note that each additional selection provides an additional visual indication to the user that another item has been selected, and that the visual indication of the selected items remains on the scroll bar even when the selected item is moved outside of the display window. Method 200 of FIG. 2 assumes that a graphical selection marker 129 is displayed on a scroll bar. However, a separate bar or display could be provided for graphical selection markers 129. The method of the present invention applies to displaying one or more graphical selection markers 129 to the user, regardless of how or where the markers are displayed. Note that method 200 of FIG. 2 assumes that as items are selected, markers are added to the scroll bar. Of course, as items are de-selected, their corresponding markers are removed, as explained in more detail below.

Figure 3:
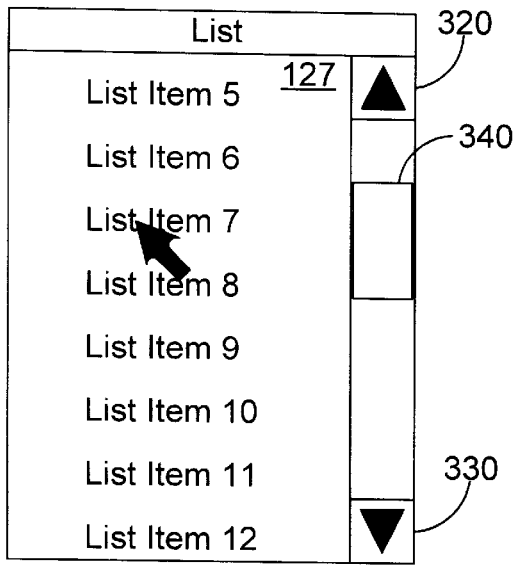
FIG. 3 is a display of a list in a display window that scrolls in one direction in accordance with a preferred embodiment.

The displays of FIGS. 3–14 will help to illustrate the use of graphical selection markers 129 of FIG. 1 in accordance with the preferred embodiments herein. These figures assume that a user is viewing a list of items, such as files in a directory. Referring to FIG. 3, a display window 127 presents a portion of the list, but the list is larger than display window 127, so a scroll bar is provided to the right of the display window 127. We assume for this example that the list is a one-dimensional list that starts at list item 1 and presents each list item in succession. Thus, the list need only be navigated in one direction, which is vertical in the example in FIG. 3. The scroll bar includes an up arrow 320, a down arrow 330, and a slider 340. As is commonly known in the art, slider 340 is preferably sized to visually represent the portion of the list that is displayed within display window 127, and the portion outside of the slider and between the up arrow 320 and the down arrow 330 represents the portions of the list that are outside of the display window 127. A user may easily navigate through the list by clicking on the up arrow 320 to move up the list, by clicking on the down arrow 330 to move down the list, by dragging the slider 340 to a new location in the list, or by clicking above or below the slider on the scroll bar. This type of navigation through a one-dimensional list using a scroll bar is well-known in the art.

Figure 4:
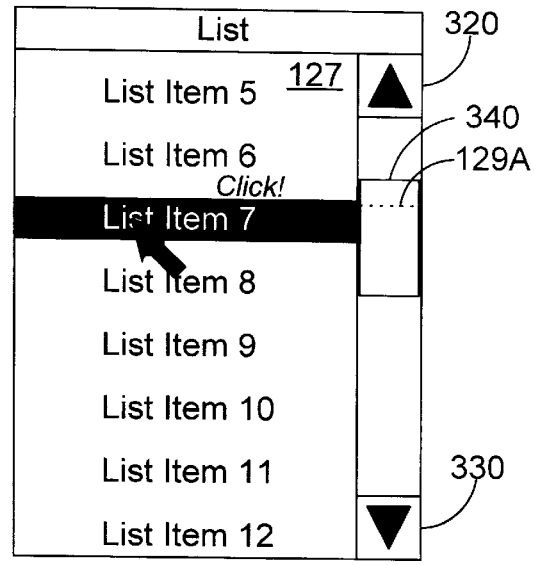
FIGS. 4–14 are each displays of the list of FIG. 3 that illustrate marking selected items in the list according to the preferred embodiments.

A user may select an item in the list displayed in FIG. 3 by clicking on an item in the list using a pointing device, as shown in FIG. 4. The user clicks on item 7, which causes item 7 to be displayed differently than non-selected list items to distinguish between selected items and items that are not selected. Known methods for providing an indication of a selected item include displaying the selected item in reverse video or in a different color, but any method for displaying selected items differently than non-selected items is within the scope of the present invention.

Once the user selects list item 7 in FIG. 4, a graphical selection marker 129A is placed in the scroll bar to indicate the location of the selected item in the list. Because the area of the scroll bar between the up arrow 320 and the down arrow 330 represents the entire list, the location of the selected item within the list is easily marked by placing the graphical selection marker 129A at the location corresponding to the selected item. For the purpose of illustration, the graphical selection markers in FIGS. 3–17 are shown as dotted lines across the scroll bar, but any form of graphical selection marker may be used. In FIG. 4, the marker 129A is within the slider 340 because item 7 is currently being displayed within display window 127.

Figure 5:
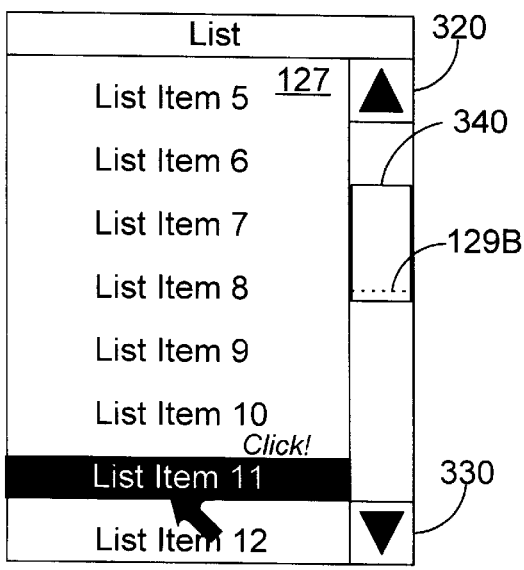

FIG. 5 illustrates what happens when a user clicks on a different item in the list after selecting item 7 in FIG. 4. If the user merely clicks on item 11, item 7 that was selected in FIG. 4 is de-selected, and item 11 is selected instead, as shown in FIG. 5. Once item 11 is selected, a graphical selection marker 129B is added to the scroll bar at the location corresponding to item 11 in the list to show that item 11 has been selected.

As illustrated in FIGS. 4 and 5, the mechanism for a user to select one item generally de-selects other selected items unless a different procedure is used. For the preferred embodiments herein, we assume that clicking on an item de-selects all previously selected items unless the control key "Ctrl" is held down while clicking the item. If the "Ctrl" key is held down while clicking the item, the item is selected in addition to the other selected items.

Figure 6:
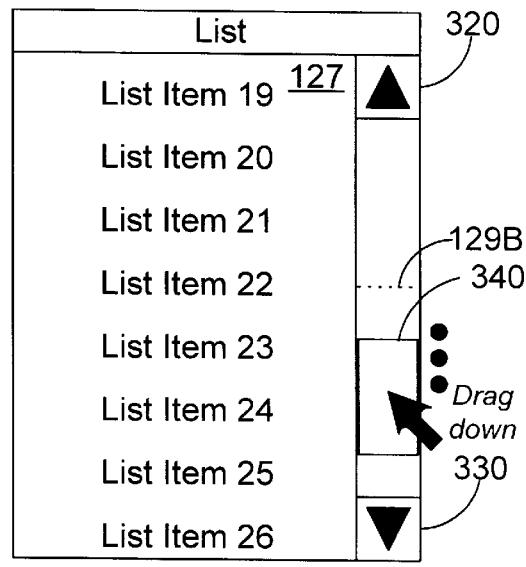

Referring now to FIG. 6, after selecting item 11 in FIG. 5, the user decides to move down in the list. The user clicks on the slider 340, and drags the slider down in the scroll bar. A new portion of the list is now displayed in display window 127, and item 11 has scrolled out of view, but the fact that item 11 is still selected is visually apparent from the graphical selection marker 129B that marks the selection of item 11 on the scroll bar.

Figures 7, 8:
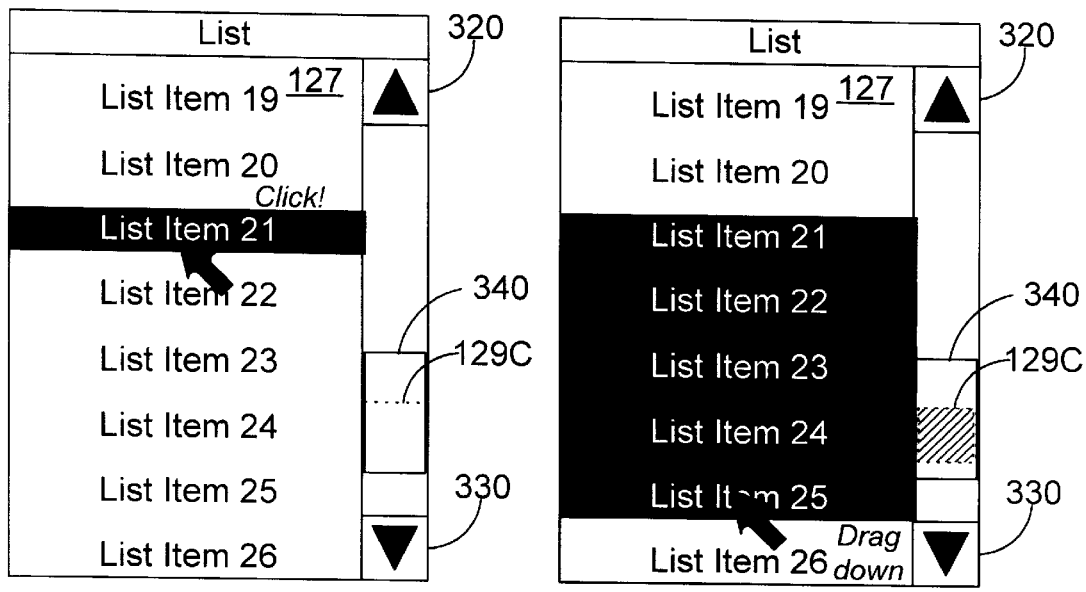

After moving to the new portion of the list in FIG. 6, a user then clicks on item 21, as shown in FIG. 7. Because the user simply clicked on item 21, item 11 that was previously selected will be de-selected, and item 21 will be selected. Thus, in the scroll bar in FIG. 7, a new graphical selection marker 129C appears representing the selection of item 21 in the list, while the graphical selection marker 129B that corresponded to item 11 disappears, providing a visual indication to the user that item 11 is no longer selected. in this manner, if the user inadvertently clicks on item 21 rather than performing a "Ctrl" click, the de-selection of item 11 is visually apparent on the scroll bar.

We now assume that the user, when clicking on item 21, drags the pointer to item 25 as shown in FIG. 8, which selects all of items 21–25. In this case, graphical selection marker 129C grows in size to represent that several items are selected. Graphical selection marker 129C goes from being a line in FIG. 7 to a box in FIG. 8. However, a group of lines on the scroll bar could also represent a group of selected items.

Figures 9, 10:
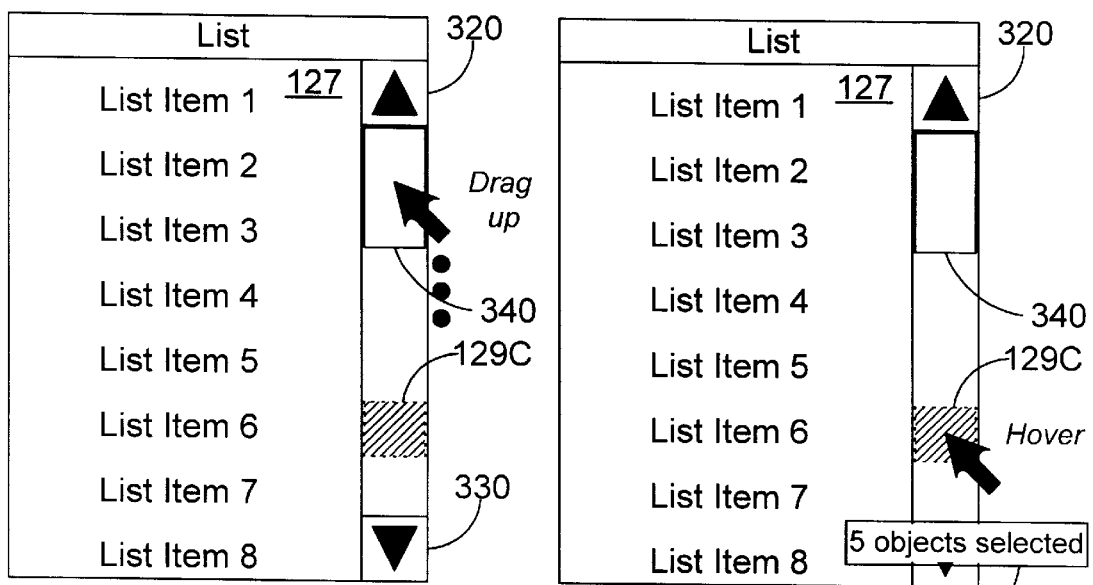

After selecting items 21–25 in FIG. 8, the user decides to navigate to the top of the list by clicking on the slider 340 and dragging it to the top of the scroll bar, as shown in FIG. 9. None of the items in the display window 127 have been selected, but the selection of items 21–25 is still readily apparent from the graphical selection marker 129C in FIG. 9.

The graphical selection marker 129C of FIG. 9 generates an information display for the user when the user places the pointer on the marker 129C without clicking on the marker, which is known in the art as "hovering" over the marker, as shown in FIG. 10. After a predetermined time period of hovering, such as a second or two, an information message 1010 is presented to the user to provide information about the selected items. In the specific example of FIG. 10, the number of selected objects is displayed to the user. However, other informational messages may also be displayed when hovering over a graphical selection marker 129. For example, the name of the selected list item that corresponds to the marker could be displayed. In addition, other operations could be defined that allow an operator to de-select items that are not in the display window 127. An example of such an operation would display to the user the name of the list item when the user hovers the pointer on the item in the scroll bar, and a right-click of the mouse or pointer could then be used to bring up a sub-menu of possible operations, such as deselecting the item. In this manner a user who has selected several items in a list, and that realizes that one of those items should not be selected, could de-select the item by hovering over markers in the scroll bar and viewing the information displays about the markers until the appropriate item is located, and then de-selecting the item without having to navigate the display window 127 to display the item.

Figure 11:
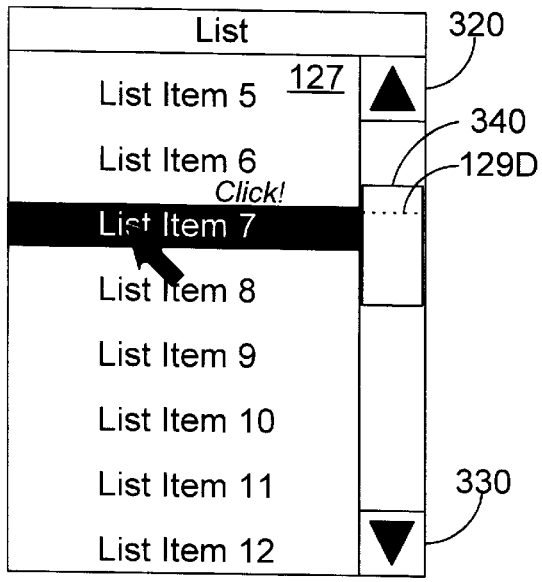
Figure 12:
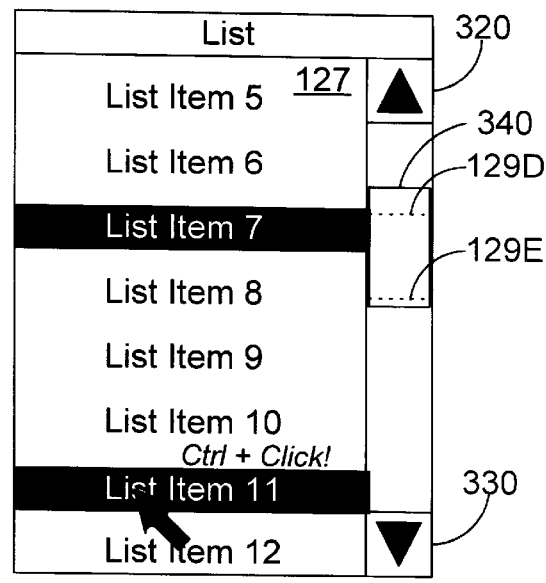

We now assume that the user has navigated to a different part of the list, and selects list item 7, by clicking on item 7, as shown in FIG. 11. A graphical selection marker 129D is displayed on the scroll bar to mark the position of selected item 7 on the scroll bar. Marker 129C disappears, indicating that items 21–25 are no longer selected. As shown in FIG. 12, item 11 may be selected in addition to item 7 by pressing "Ctrl" as item 11 is clicked. Now both items 7 and 11 are selected, and each have corresponding markers 129D and 129E, respectively, displayed on the scroll bar.

Figure 13:
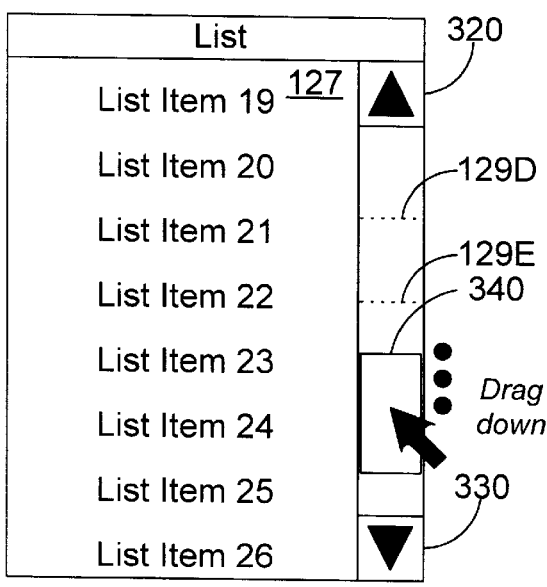
Figure 14:
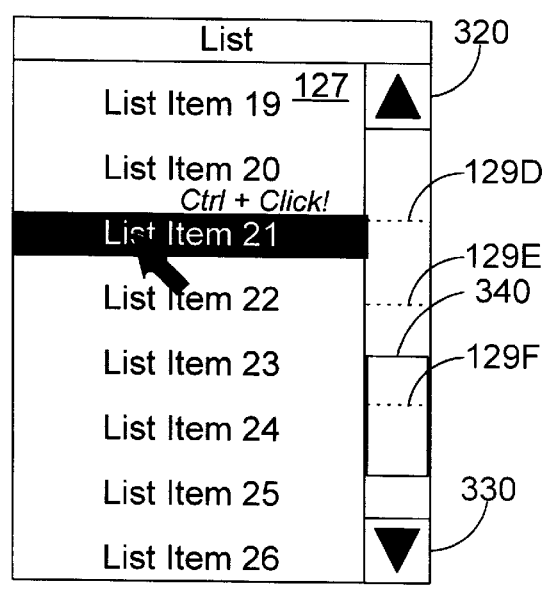

Next the user decides to navigate down in the list by clicking on the slider 340 and dragging the slider to a new portion of the list, as shown in FIG. 13. Note that the selection of items 7 and 11 are still indicated on the scroll bar of FIG. 13 by markers 129D and 129E. At this point the user decides to add item 21 to the selected items by pressing "Ctrl" as item 21 is clicked. A new marker 129F appears on the scroll bar to indicate the location of the selected item in the list. Markers 129D and 129E provide a visual indication that items 7 and 11 are still selected. At this point a user can perform operations on the group of selected items. For example, if the list were a list of files in a directory, the user could then perform a copy of the selected files to another directory or to a floppy disk.

Figure 15:
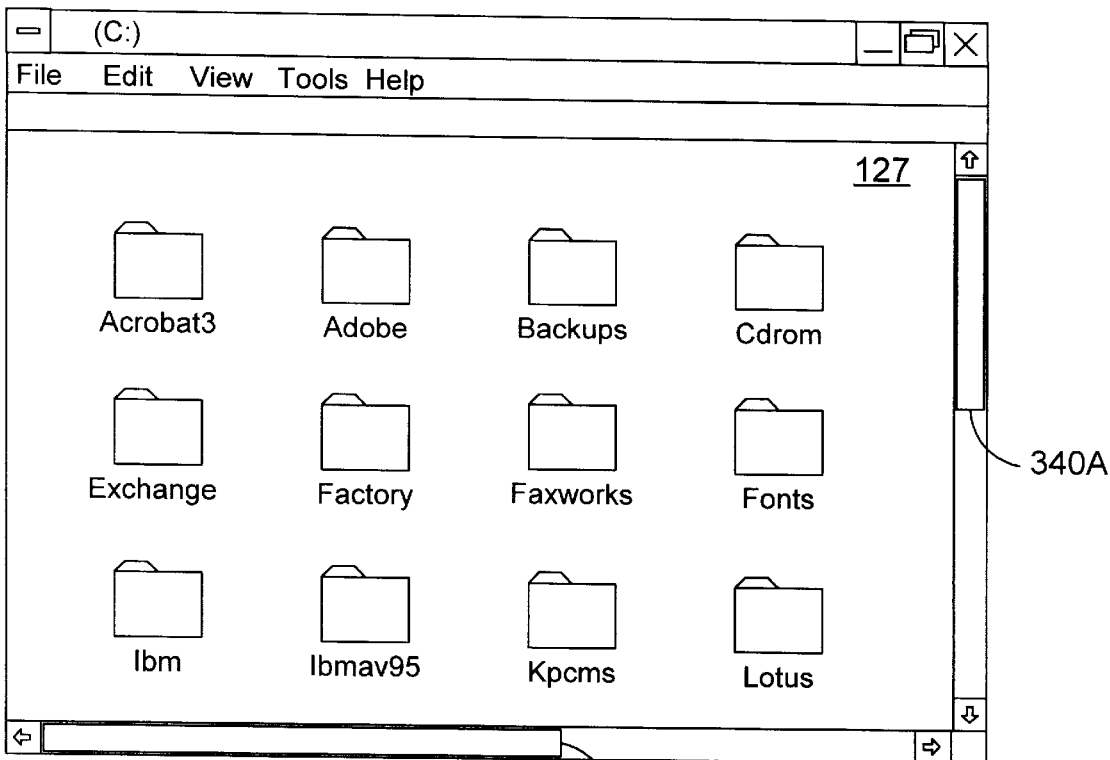
FIG. 15 is a display of a list in a display window that scrolls in two directions in accordance with the preferred embodiments.

While FIGS. 3–14 show the use of graphical selection markers on a one-dimensional list that has a single scroll bar, the present invention extends to marking selected items in any type of list or graphical representation. FIG. 15 shows a two dimensional display of file folders on a hard disk drive labeled (C:). A vertical scroll bar is provided to the right of the display to allow navigation up and down in the two dimensional list, while a horizontal scroll bar is provided at the bottom of the display for navigating left and right in the list. The vertical scroll bar includes a slider 340A, and the horizontal scroll bar includes a slider 340B.

Figure 16:
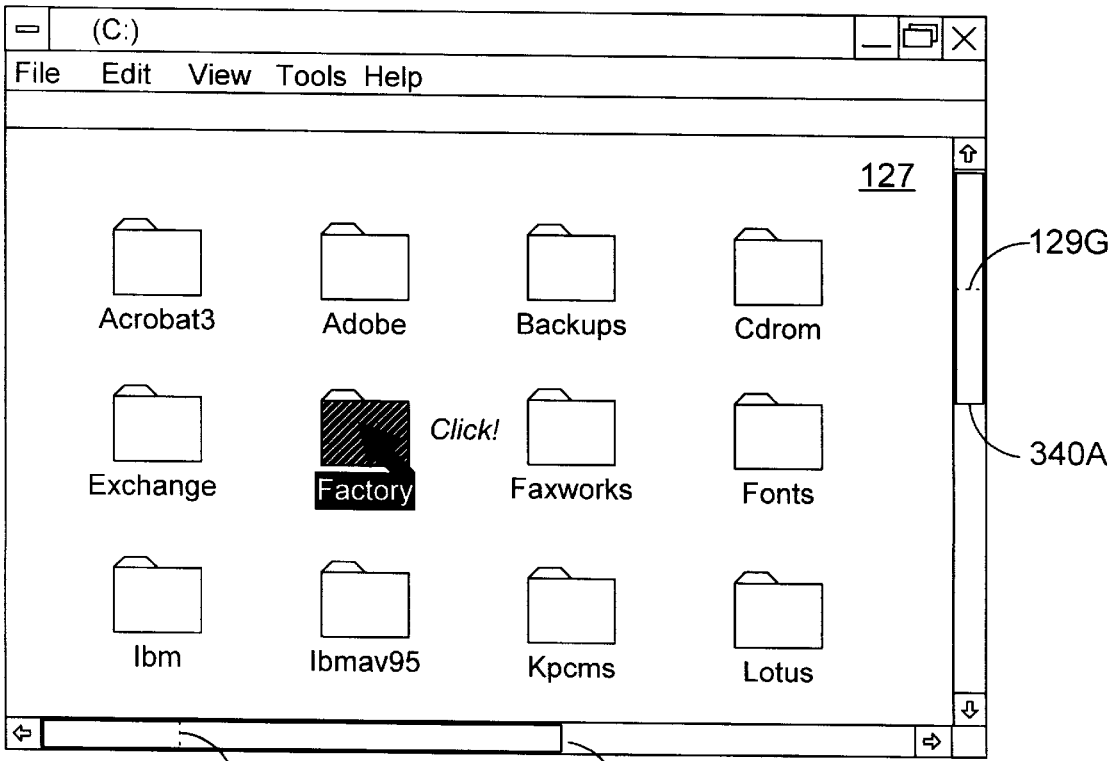
FIGS. 16 and 17 are each displays of the list of FIG. 15 that illustrate marking a selected item in the list according to the preferred embodiments.
Figure 17:
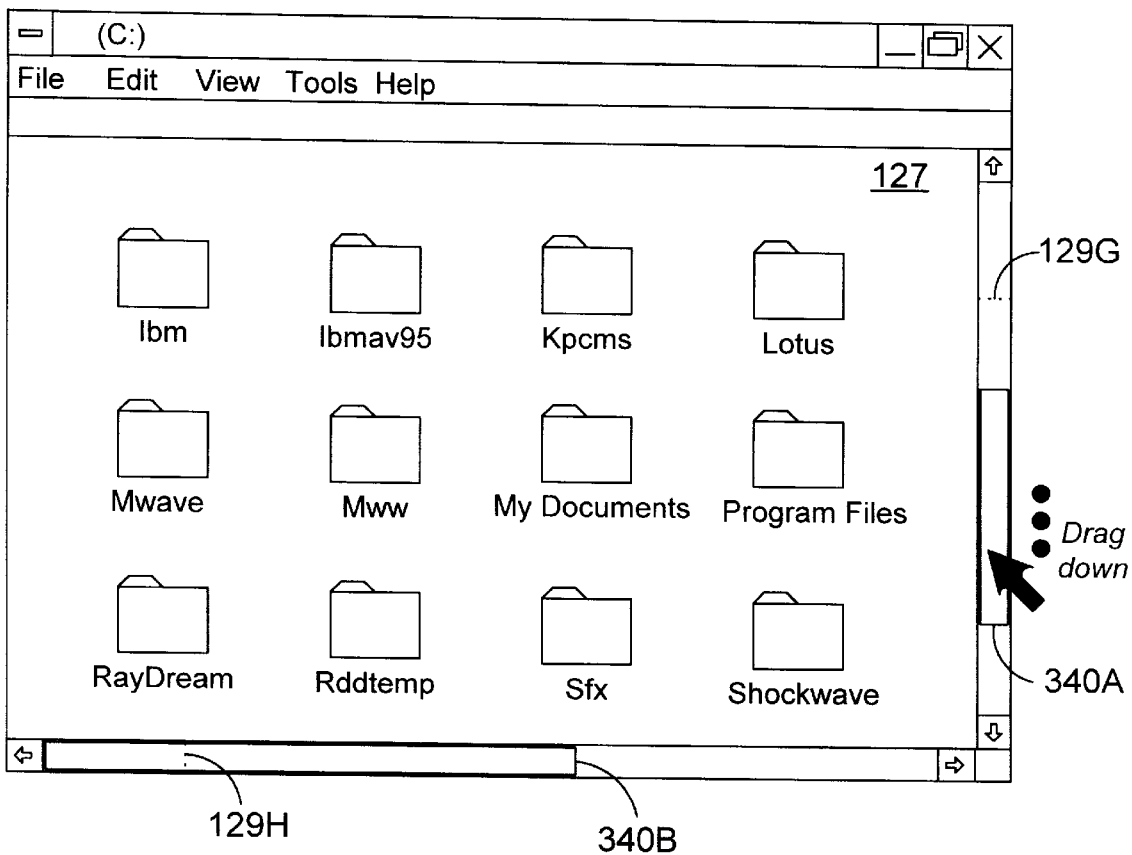

Referring to FIG. 16, we now assume that the user selects the Factory folder in the list by clicking on the Factory folder as shown. The location of the factory folder within the two-dimensional list is indicated on both scroll bars using markers 129G and 129H. In FIG. 17, the user navigates down in the list by clicking on the slider 340A and dragging the slider down. Even though the Factory folder is no longer visible, the fact that it is still selected is evident from markers 129G and 129H in the two scroll bars. Note that displaying the selection of an item in a two-dimensional display requires two markers, one on each scroll bar. In the preferred embodiment, these two markers are distinguished from other sets of markers using color, different marker icons, or other methods of visual distinction so that the user can easily tell which marker on the vertical scroll bar goes with which corresponding marker on the horizontal scroll bar.

The preferred embodiments described herein provide an improved user interface by providing a user with a visual indication of selected items in a list, even when the list is larger than the display window. By providing visual feedback to the user regarding which items are selected, the user can more easily assure that the proper items are selected before performing operations on those items.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the preferred embodiments disclosed herein show the display of the graphical selection markers on a scroll bar, the presence of a scroll bar is not required. A separate display portion could be provided to display the graphical selection markers. Any means for displaying a graphical selection marker to a user is expressly within the scope of the present invention.

We claim:

1. An apparatus comprising:
   at least one processor;
   a memory coupled to the at least one processor;
   a computer program residing in the memory, the computer program generating a display window that displays a portion of a list of items that is larger than the display window;

at least one graphical selection marker that provides a visual indication of at least one selected item in the list that is outside of the display window, each graphical selection marker having a representation of a first size when representing a single selected item in the list and having a representation of a second size that is larger than the first size when representing a plurality of selected items in the list; and an information message that is displayed when a pointing device hovers over the at least one graphical selection marker, the information message being used to facilitate possible deselection of the at least one selected item.

2. The apparatus of claim 1 wherein the at least one graphical selection marker provides a visual indication of at least one selected item in the list that is within the display window.

3. The apparatus of claim 1 further comprising at least one scroll bar that allows navigation through the list to present different portions of the list in the display window, wherein the at least one graphical selection marker is displayed on the at least one scroll bar.

4. The apparatus of claim 1 wherein the at least one graphical selection marker provides a visual indication of location of the at least one selected item within the list.

5. The apparatus of claim 4 wherein the visual indication of location includes relative position of the at least one selected item within the list.

6. The apparatus of claim 1 wherein the second size varies according to the number of the plurality of selected items in the list that are represented by the graphical selection marker.

7. An apparatus comprising:

at least one processor;

a memory coupled to the at least one processor;

a display terminal coupled to the at least one processor;

a computer program residing in the memory, the computer program presenting a display window on the display terminal that displays a portion of a list of items that is larger than the display window;

at least one scroll bar that allows navigation through the list to present different portions of the list in the display window;

at least one graphical selection marker that provides a visual indication on the at least one scroll bar of at least one selected item in the list, each graphical selection marker having a representation of a first size when representing a single selected item in the list and having a representation of a second size that is larger than the first size when representing a plurality of selected items in the list; and an information message that is displayed when a pointing device hovers over the at least one graphical selection marker, the information message being used to facilitate possible deselection of the at least one selected item.

8. The apparatus of claim 7 wherein the second size varies according to the number of the plurality of adjacent selected items in the list that are represented by the graphical selection marker.

9. An apparatus comprising:

a memory;

a computer program residing in the memory;

means residing in the memory for displaying a portion of a list of items in a display window;

means residing in the memory for displaying at least one graphical selection marker that provides a visual indication of at least one selected item in the list that is outside of the display window, each graphical selection marker having a representation of a first size when representing a single selected item in the list and having a representation of a second size that is larger than the first size when representing a plurality of selected items in the list; and means residing in the memory for displaying an information message when a pointing device hovers over the at least one graphical selection marker, the information message being used to facilitate possible deselection of the at least one selected item.

10. The apparatus of claim 9 wherein the at least one graphical selection marker provides a visual indication of at least one selected item in the list that is within the display window.

11. The apparatus of claim 9 wherein the second size varies according to the number of the plurality of adjacent selected items in the list that are represented by the graphical selection marker.

12. A method for providing a visual indication of at least one selected item in a list of items, the method comprising the steps of:

displaying a portion of the list in a display window;

displaying at least one graphical selection marker corresponding to at least one selected item in the list that is outside of the display window, each graphical selection marker having a representation of a first size when representing a single selected item in the list and having a representation of a second size that is larger than the first size when representing a plurality of selected items in the list; and displaying an information message when a pointing device hovers over the at least one graphical selection marker, the information message being used to facilitate possible deselection of the at least one selected item.

13. The method of claim 12 further comprising the step of displaying at least one graphical selection marker corresponding to at least one selected item in the list that is within the display window.

14. The method of claim 12 further comprising the steps of:

providing at least one scroll bar that allows navigation through the list to present different portions of the list in the display window; and displaying the at least one selection marker on the at least one scroll bar.

15. The method of claim 12 wherein the at least one graphical selection marker provides a visual indication of location of the at least one selected item within the list.

16. The method of claim 15 wherein the visual indication of location includes relative position of the at least one selected item within the list.

17. The method of claim 12 wherein the second size varies according to the number of the plurality of adjacent selected items in the list that are represented by the graphical selection marker.

18. A program product comprising:

a computer program that generates a display window that displays a portion of a list of items that is larger than the display window, the computer program including at least one graphical selection marker that provides a visual indication of at least one selected item in the list that is outside of the display window, each graphical selection marker having a representation of a first size when representing a single selected item in the list and having a representation of a second size that is larger than the first size when representing a plurality of selected items in the list, the computer program displaying an information message when a pointing device hovers over the at least one graphical selection marker, the information message being used to facilitate possible deselection of the at least one selected item; and signal bearing media bearing the computer program.

19. The program product of claim 18 wherein the signal bearing media comprises recordable media.

20. The program product of claim 18 wherein the signal bearing media comprises transmission media.

21. The program product of claim 18 wherein the at least one graphical selection marker provides a visual indication of at least one selected item in the list that is within the display window.

22. The program product of claim 18 further comprising at least one scroll bar that allows navigation through the list to present different portions of the list in the display window, wherein the at least one graphical selection marker is displayed on the at least one scroll bar.

23. The program product of claim 18 wherein the at least one graphical selection marker provides a visual indication of location of the at least one selected item within the list.

24. The program product of claim 23 wherein the visual indication of location includes relative position of the at least one selected item within the list.

25. The program product of claim 18 wherein the second size varies according to the number of the plurality of adjacent selected items in the list that are represented by the graphical selection marker.

* * * * *